United States Patent Office 2,930,187
Patented Mar. 29, 1960

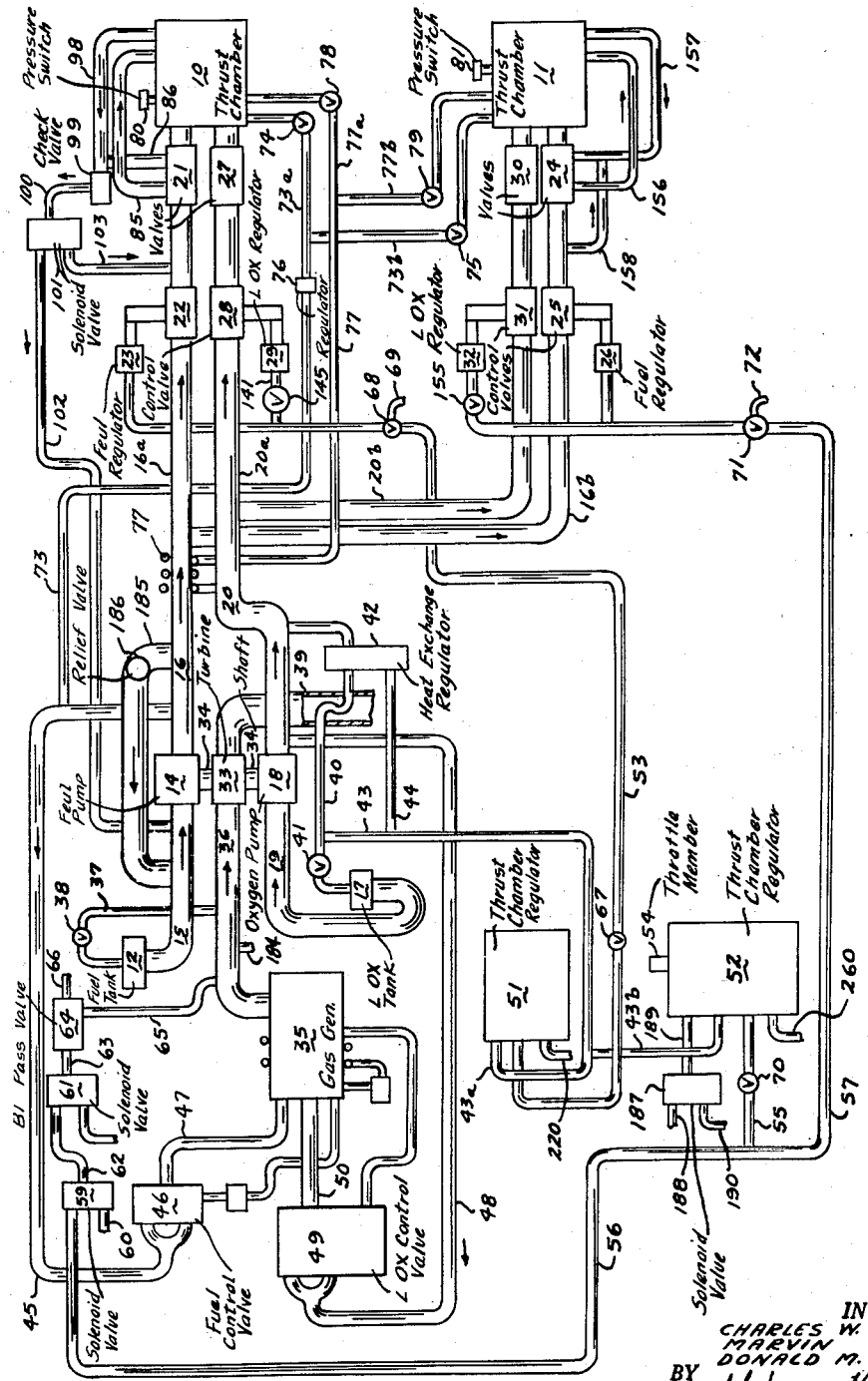

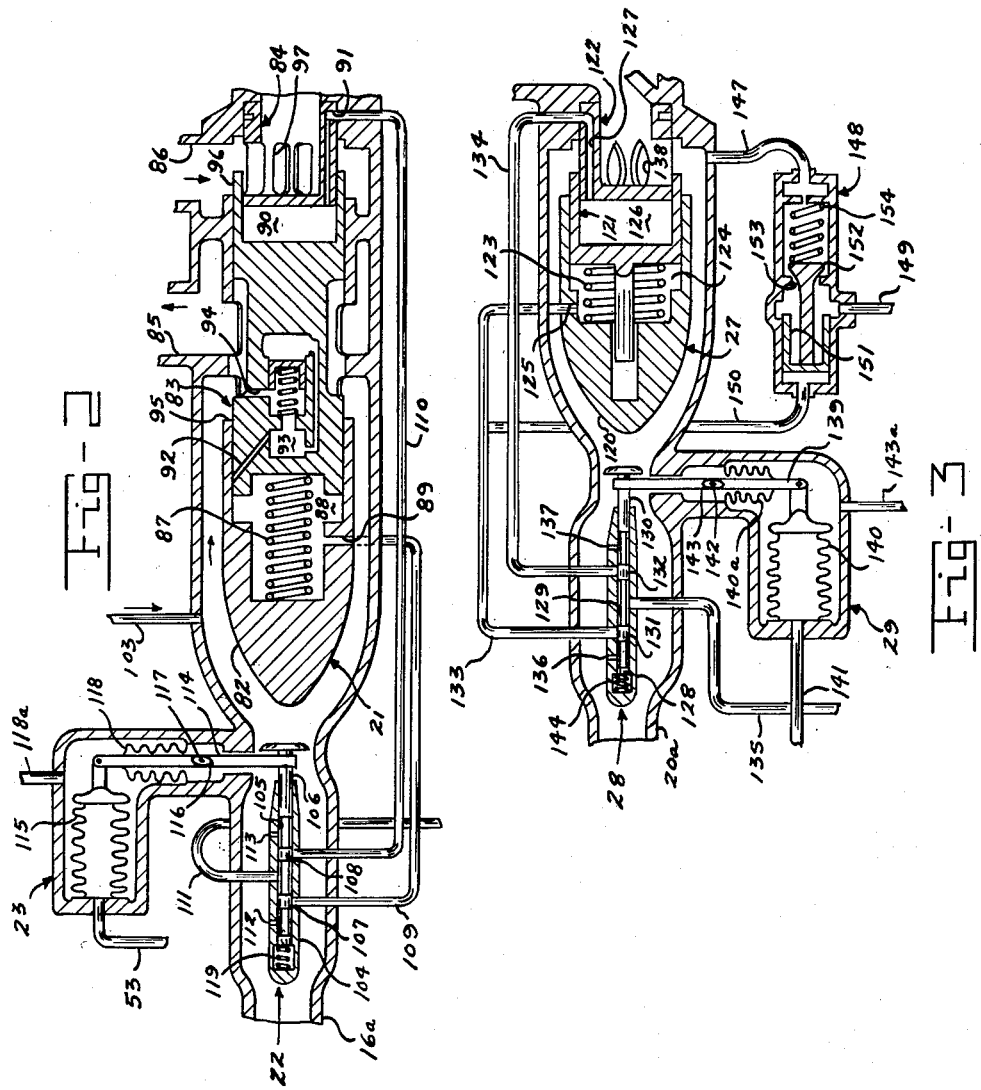

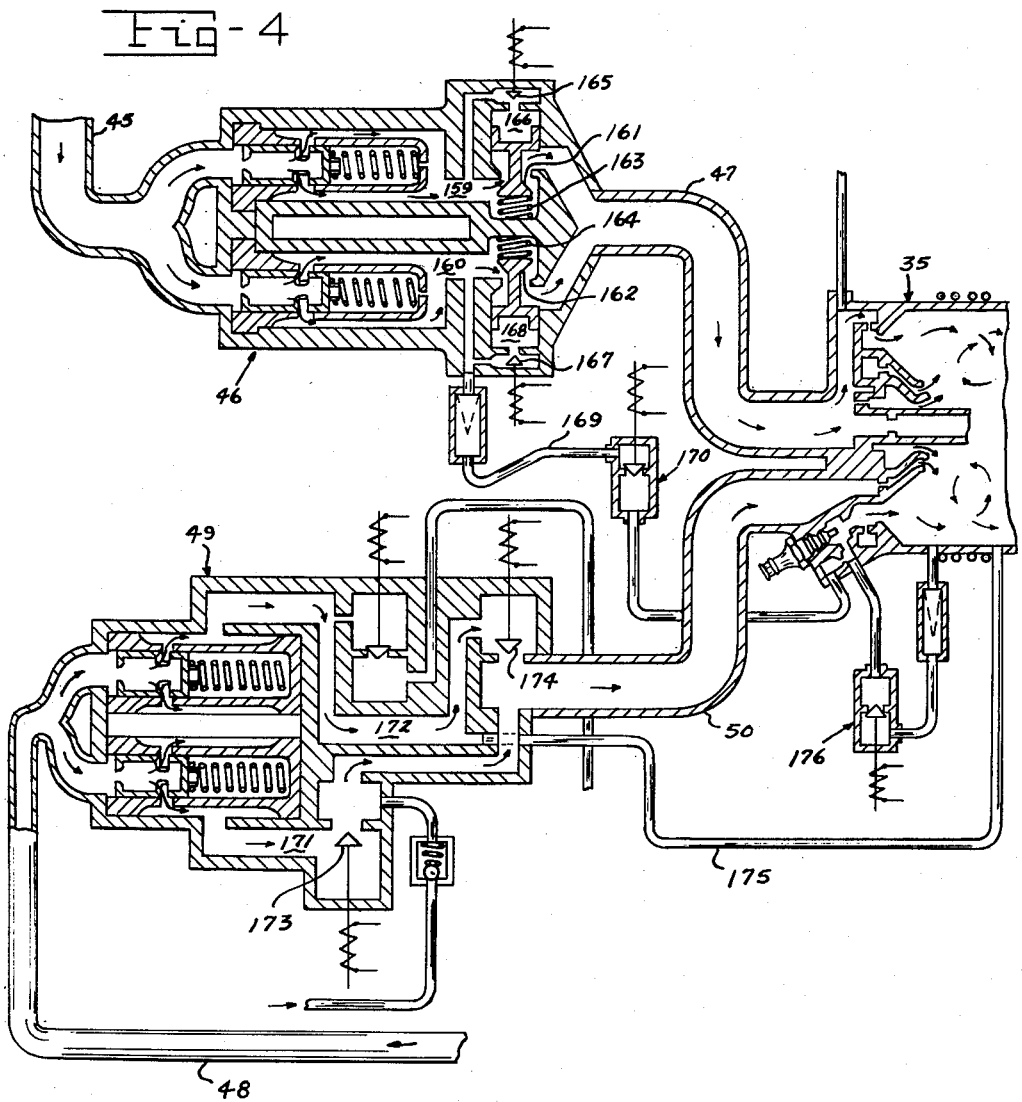

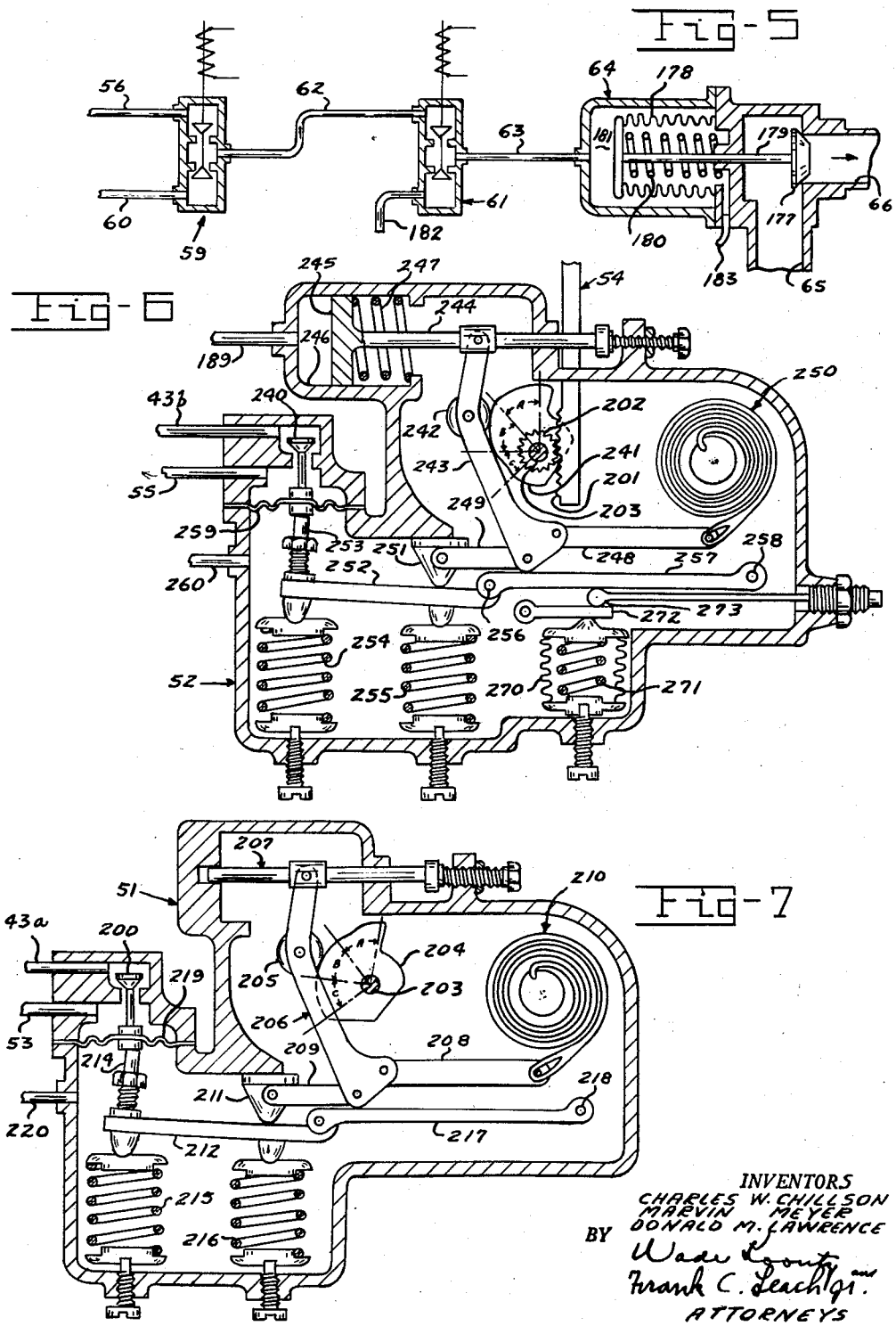

2,930,187

VARIABLE THRUST ROCKET ENGINE

Charles W. Chillson, Packanack Lake, Marvin Meyer, West Caldwell, and Donald M. Lawrence, Wood-Ridge, N.J., assignors to the United States of America as represented by the Secretary of the Air Force Application November 23, 1956, Serial No. 624,181

4 Claims. (Cl. 60—35.6)

This invention relates to a rocket engine and, more particularly, to a rocket engine having a variable thrust control.

A problem with rocket engines has been that a variable thrust from the rocket engine has not been available except in rather large increments obtained from firing one or more thrust chambers at the same time. Thus, such rocket engines were not capable of providing a continuous varying thrust over a large range but were merely capable of providing different thrusts depending on the number of thrust chambers being fired.

The present invention satisfactorily solves this problem by providing a rocket engine that supplies a thrust, which may be varied over a large range. The present invention provides this variable thrust by employing two thrust chambers, which are throttable from 50% of maximum thrust to the maximum thrust with the thrust chambers producing different maximum thrusts.

An object of this invention is to provide a rocket engine that has a varying thrust range.

Another object of this invention is to provide a rocket engine that has two thrust chambers of varying thrust to produce a throttable thrust range.

Other objects of this invention will be readily perceived from the following description.

This invention relates to a rocket motor including two thrust chamber with each producing a different maximum thrust. Means supply fuel and oxidizer to both of the thrust chambers. Control means stop the supply of fuel and oxidizer to one of the thrust chambers and vary the supply of fuel to the other thrust chamber to produce a first thrust range, the control means stop the supply of fuel and oxidizer to the other thrust chamber and vary the supply of fuel and oxidizer to the one thrust chamber to produce a second thrust range, and the control means allows a supply of fuel and oxidizer to both of the thrust chambers and varies the supply of fuel and oxidizer to the one thrust chamber to produce a third thrust range.

The attached drawings illustrate a preferred embodiment of the invention, in which—

Fig. 1 is a schematic view of the present invention;

Fig. 2 is a sectional view of a portion of the present invention including one of the fuel valves and its control mechanism;

Fig. 3 is a sectional view of a portion of the present invention including one of the oxidizer valves and its control mechanism;

Fig. 4 is a sectional view of a portion of the present invention including the fuel and oxidizer valves for the generator;

Fig. 5 is a sectional view of a portion of the present invention including the turbine by-pass valve and its control mechanism;

Fig. 6 is a schematic view of a control regulator for one of the the thrust chambers of the present invention; and Fig. 7 is a schematic view of a control regulator for the other of the thrust chambers of the present invention.

Referring to the drawings and particularly Fig. 1, there are shown thrust or combustion chambers 10 and 11 having varying maximum thrust. In the disclosed example, the thrust chamber 10 is capable of developing a maximum thrust of 5,000 pounds and the thrust chamber 11 is capable of developing a maximum thrust of 10,000 pounds. While the thrust developed by the thrust chamber 10 varies from 2,500 pounds to 5,000 pounds and the thrust produced by the thrust chamber 11 varies from 5,000 pounds to 10,000 pounds, it will be understood that a thrust chamber might be designed whereby the minimum thrust might be less than 50% of the maximum thrust as is the situation with respect to the present invention provided the maximum thrust of the smaller chamber equalled the minimum thrust of the larger chamber.

Fuel, which is preferably a mixture of water and alcohol, and liquid oxygen are supplied to the thrust chambers 10 and 11 for producing combustion therein. The fuel is supplied to the thrust chambers 10 and 11 from a tank 12 by a pump 14. The inlet of the pump 14 is connected to the tank 12 by a conduit 15 while the outlet of the pump 14 discharges into a conduit 16 having a branch 16a to the thrust chamber 10 and a branch 16b to the thrust chamber 11.

The liquid oxygen is supplied to the thrust chambers 10 and 11 from a tank 17 by a pump 18. A conduit 19 connects the tank 17 with the inlet of the pump 18 while the outlet of the pump 18 discharges into a conduit 20 having a branch 20a to the thrust chamber 10 and a branch 20b to the thrust chamber 11.

A valve 21 in the line 16a controls the amount of fuel supplied to the thrust chamber 10. A control valve 22 in the line 16a governs movement of the valve 21 in response to a regulator 23 to which the valve 22 is connected. The flow of fuel through the line 16b is governed by a valve 24 therein. The movement of the valve 24 is controlled by a valve 25 in the line 16b in response to a regulator 26 to which the control valve 25 is connected.

The flow of liquid oxygen to the thrust chamber 10 is regulated by a valve 27 in the line 20a. A control valve 28, which is connected to a regulator 29, governs the movement of the valve 27. The supply of liquid oxygen to the thrust chamber 11 is varied by a valve 30 in the line 20b. A valve 31 in the line 20b controls the movement of the valve 30 in response to a regulator 32 to which the control valve 31 is connected.

The fuel pump 14 and the liquid oxygen pump 18 are driven by a turbine 33 through a common shaft 34. A gas generator 35 supplies a fuel rich vapor through a line 36 to drive the turbine 33. The fuel tank 12 is pressurized by vapor flowing from the line 36 through a line 37 to the top of the tank 12. A regulator valve 38 in the line 37 maintains the tank at a predetermined pressure and also relieves pressure if it exceeds a predetermined value.

The exhaust gases of the turbine pass through a duct 39 in which is disposed a portion of a line 40, which connects the liquid oxygen conduit 20 to the top of the liquid oxygen tank 17. The portion of the liquid oxygen bled off through the line 40 is heated by the exhaust gases of the turbine flowing through the duct 39 to be transformed into oxygen gas for pressurizing the tank 17. A regulator valve 41 in the line 40 maintains the tank 17 at a predetermined pressure and further serves to relieve excess oxygen gas if a predetermined maximum pressure is reached. A heat exchanger regulator 42 governs the pressure of the liquid oxygen flowing in heat exchange relation with the turbine exhaust gases of the duct 39. The pressure of the oxygen gas in the line 40 is transmitted through the lines 43 and 44 to the regulator 42.

The gas generator 35 is supplied with fuel from the conduit 16 through a conduit 45, a valve 46, and a line 47. The valve 46 regulates the amount of fuel flowing to the gas generator. Liquid oxygen is supplied to the gas generator 35 from the line 20 through a conduit 48, a valve 49, and a line 50. The valve 49 determines the amount of liquid oxygen supplied to the gas generator 35.

The line 43 supplies oxygen gas from the conduit 40 through a branch 43a to a thrust chamber regulator 51 for the thrust chamber 10. A thrust chamber regulator 52 for the thrust chamber 11 is supplied oxygen gas through a branch 43b of the line 43. The oxygen gas flows from the regulator 51 through a conduit 53 to supply pressure to the fuel regulator 23 and the liquid oxygen regulator 29 of the thrust chamber assembly of the thrust chamber 10. A throttle member 54 controls the position of a valve 200 (see Fig. 7) within the regulator 51 through a linkage system for determining the amount of flow of oxygen gas from the branch 43a through the regulator 51 and the conduit 53 to the regulators 23 and 29.

The throttle member 54 has teeth 201 (see Fig. 6) on the end thereof that cooperate with a toothed member 202 secured to a shaft 203. The shaft 203 has a cam member 204 (see Fig. 7) secured thereto that cooperates with a roller 205 mounted on an arm 206. One end of the arm 206 is pivotally connected to a rod 207, which is mounted in the housing of the regulator 51. The other end of the arm 206 is pivotally connected to a first rod 208 and a second rod 209. The other end of the first rod 208 is connected to a resilient member such as a spring 210, which urges the rod 208 and the arm 206 to the right, as viewed in Fig. 7. It will be readily observed that the position of the roller 205 on the surface of the cam 204 determines the amount of movement of the arm 206 by the spring 210. The other end of the second rod 209 is connected to a fulcrum member 211 about which a lever 212 moves. A stud 214 extends upwardly from the lever 212 to engage a portion of the valve member 200 whereby movement of the lever 212 is transmitted to the valve member 200. Resilient means such as a spring 215 acts against the end of the lever 212 having the stud 214 thereon. Resilient means such as a spring 216 acts against the other end of the lever 212 to which is pivoted a lever 217 having its other end pivotally connected to the housing of the regulator 51 at 218.

As is readily observed from Fig. 7, the position of the fulcrum member 211 determines the amount of opening of the valve 200. Thus, when the fulcrum member 211 is disposed between the two springs 215 and 216, the springs counterbalance each other and the valve member 200 is closed. The more that the fulcrum member 211 moves to the right, as viewed in Fig. 7, the farther the valve member 200 is moved from its closed position. This, of course, permits more oxygen gas to flow from the branch conduit 43a through the conduit 53. The movement of the fulcrum member 211 to the right is determined by the position of the cam member 204.

The movement of the cam member 204 through the angle A moves the valve member 200 from its closed position to its fully open position. The rotation of the cam member through the angle B and the angle C merely maintains the valve member 200 in its fully open position. This is accomplished by making the portion of the surface of the cam defined by the angles B and C a circle. A diaphragm 219 seals the portion of the housing of the regulator 51 containing the valve member 200 and the conduits 43a and 53 through which the oxygen gas flows from the remainder of the housing of the regulator 51. The remainder of the housing of the regulator 51 is maintained at atmospheric pressure through a vent pipe 220.

The oxygen gas flows from the regulator 52 through a conduit 55 into branch conduits 56 and 57. The amount of flow of oxygen gas through the regulator 52 is determined by a valve 240 (see Fig. 6) that is actuated by the throttle member 54 through a linkage system within the regulator 52. The oxygen gas flowing through the line 57 provides pressure for actuating the fuel regulator 26 and the liquid oxygen regulator 32 of the thrust chamber assembly of the thrust chamber 11.

The shaft 203 to which the toothed member 202 is secured also has a cam member 241, which is disposed within the housing of the regulator 52, secured thereto (see Fig. 6). The cam member 241 cooperates with a roller 242 secured to an arm 243 having one end fixed to a movable member 244. The movable member 244 includes a piston portion 245 movable within a cylinder 246 formed in the housing of the regulator 52. Resilient means such as a spring 247 acts against one side of the piston portion 245 of the movable member 244. At a specified time, the other side of the piston portion 245 is subject to a gas pressure supplied through a conduit 189.

The other end of the arm 243 is pivotally connected to a first rod 248 and a second rod 249. The other end of the first rod 248 is connected to a resilient means such as a spring 250, which urges the first rod 248 and the arm 243 to move to the right, as viewed in Fig. 6. The other end of the second rod 249 is connected to a fulcrum member 251 about which a lever 252 pivots. The lever 252 has a stud 253 projecting from one end thereof to act against the valve member 240 to move the valve member. A spring 254 acts against the end of the lever 252 on which the stud 253 is mounted while a similar spring 255 acts against the other end of the lever 252; the other end of the lever 252 is pivotally connected at 256 to a second lever 257, which is pivotally secured at 258 to the housing of the regulator 52.

As will be seen from Fig. 6, the movement of the fulcrum member 251 to the right reduces the force of the spring 255 acting against the lever 252 to permit further opening of the valve member 240 due to the force of the spring 254. As the fulcrum member 251 moves to the right, the valve member 240 moves towards its fully open position.

When the cam member 241 is moved through the angle A, which is the same angle that the cam member 204 is moved through since the two cam members are both on the shaft 203, there is no movement of the arm 243 and, thus, no movement of the valve member 240 since this portion of the surface of the cam member 241 corresponding to the angle A is a circle. When the cam member 241 rotates through the angle B, the valve member 240 is moved from its closed position to a fully open position. As will be explained hereinafter, when the valve member has reached its fully open position due to the cam member 241 having rotated through the angle B, the maximum amount of thrust is being delivered by the thrust chamber 11; this, of course, being 10,000 pounds. After the thrust chamber 11 reaches its maximum, the thrust chamber 10 is then utilized again and it is desirable that the thrust chamber 11 be reduced to its minimum thrust of 5,000 pounds. This is accomplished by supplying nitrogen gas through a conduit 189, as explained hereinafter, into the interior of the cylinder 246 to move the member 244 to the right, as viewed in Fig. 6. This movement of the member 244 causes the fulcrum member 251 to be moved to the left whereby the valve member 240 is moved to the position wherein the thrust chamber 11 is operating at its minimum thrust of 5,000. Thereafter, as the cam member 241 is rotated through the angle C by the throttle member 54, the spring 250 tends to move the fulcrum member to the right, as viewed in Fig. 6, through the arm 243; the spring 247, which was compressed by movement of the member 244 due to the supply of nitrogen gas to the interior of the cylinder 246, aids in this movement of the fulcrum member 251 to the right by acting against the piston portion 245 of the member 244. When the cam member 241 has moved through the angle C, the valve member 240 is again at its fully open position and both chambers are operating at their full thrust.

The portion of the housing of the regulator 52, which contains the valve member 240 and the conduits 43b and 55 through which the oxygen gas flows, is separated from the remainder of the housing by a diaphragm 259. The remainder of the housing of the regulator 52 is maintained at atmospheric pressure by a vent pipe 260.

As the altitude at which the rocket engine is operating increases, the thrust of the chambers 10 and 11 increases. However, the thrust of the chamber 11 increases at a greater ratio than the thrust of the chamber 10 with respect to the increase in altitude. Thus, the minimum thrust of the chamber 11 at high altitude is greater than the maximum thrust of the chamber 10 whereas these two thrusts were equal at sea level.

In order to compensate for this change in thrust, an aneroid bellows 270 (see Fig. 6) is disposed within the housing of the regulator 52. A spring 271 is disposed within the bellows 270 and exerts an upward force on a pivoted member 272. This pivoted member 272 acts through a ball member 273 against the lever 257 to reduce the opening of the valve 240 by moving the fulcrum member 251 even though the cam member 241 is not moved. Since the housing of the regulator 52 is exposed to the atmospheric pressure through the vent pipe 260, the movement of the aneroid bellows 270 is governed by the atmospheric pressure. Thus, as the pressure decreases, the bellows 270 expands due to the force of the spring 271 to move the valve 240 toward its closed position. The ball member 273 is adjustable to vary the force imposed on the lever 257 by the aneroid bellows 270 and the spring 271.

The oxygen gas flowing through the branch conduit 56 is supplied to a solenoid valve 59. The solenoid valve 59 is also supplied with nitrogen at a predetermined pressure from a suitable source (not shown) through a line 60. The position of the solenoid valve 59 determines whether oxygen gas from the line 56 or nitrogen gas from the line 60 is supplied to a solenoid valve 61 through a line 62. The solenoid valve 61 controls the flow of either oxygen gas or nitrogen gas from the line 62 through a line 63 to a valve 64. The valve 64 functions as a bypass valve for removing excess vapor flowing through the line 36 when the required output of the turbine 33 is less than the output of the generator 35. The valve 64 is connected to the line 36 by a line 65 and vents the excess vapor through a line 66.

A solenoid valve 67 is disposed in the line 53 to stop flow of oxygen gas therethrough when desired. A second solenoid valve 68 is located in the line 53 between the valve 67 and the regulators 23 and 29. When the second solenoid valve 68 is energized, it vents the oxygen gas from the regulators 23 and 29 through a line 69 to release the pressure therefrom. A solenoid valve 70 is located in the branch conduit 55 to stop the flow of oxygen gas therethrough. A solenoid valve 71 is disposed in the branch conduit 57 to vent the oxygen gases in the regulators 26 and 32 through a line 72 when desired.

Fuel and liquid oxygen are supplied to the thrust chambers 10 and 11 for starting combustion therein in an ignitor portion thereof. The fuel flows from the line 16 through the line 45, a conduit 73, and branch conduits 73a and 73b to the thrust chambers 10 and 11, respectively.

A solenoid valve 74 in the branch 73a is energized to permit flow of fuel to the combustion chamber 10. When energized, a solenoid valve 75 in the branch 73b allows flow of fuel to the combustion chamber 11 for ignition. A regulator 76 in the line 73 maintains the pressure of the fuel flowing through the branches 73a and 73b at a predetermined maximum. Liquid oxygen flows from the line 20 through a line 77, which has a branch 77a to the thrust chamber 10 and a branch 77b to the thrust chamber 11. A portion of the conduit 77 is coiled around the fuel line 16 to heat the liquid oxygen passing therethrough to transform it to a gaseous oxygen. A solenoid valve 78 allows the flow of gaseous oxygen through the branch 77a to the thrust chamber 10 when energized. A solenoid valve 79 in the branch 77b permits the supply of gaseous oxygen to the thrust chamber 11 when energized.

A pressure switch 80 is responsive to pressure in the interior of the thrust chamber 10 to indicate when combustion has been initiated in the chamber 10. A similar pressure switch 81 indicates when combustion occurs within the combustion chamber 11.

Referring to Fig. 2, the details of the fuel valve 21, the control valve 22 and the regulator 23 are shown. The valve 21 includes fixed members 82 and 84 and a movable member 83. The movable member 83 controls the flow of fuel from the branch 16a through a conduit 85, which supplies fuel to a cooling jacket (not shown) on the end of the thrust chamber 10. The details of the cooling jacket are disclosed in the copending application of Alfred Africano et al., Serial No. 624,182, filed November 23, 1956. The fuel returns to the branch 16a through a conduit 86 and this flow is also controlled by the movable member 83. Resilient means such as a spring 87 is disposed between the fixed member 82 and the movable member 83 in a chamber 88 therebetween to urge the movable member 83 towards its closed position. A passage 89 in the fixed member 82 supplies fuel under pressure to the chamber 88 from the control valve 22 to maintain the movable member 83 in its closed position. The movable member 83 is actuated to an open position by the control valve 22 supplying fuel under pressure to a chamber 90 between the movable member 83 and the stationary member 84 through a passage 91 in the stationary member 84. At the same time that the fuel is supplied to the chamber 90, it is vented from the chamber 88 through the passage 89 by the control valve 22.

When the movable member 83 is in its closed position, a small amount of fuel is still supplied from the branch 16a through the conduit 85 to the cooling jacket for cooling the end of the combustion chamber 10. The fuel flows through an inclined passage 92 in the movable member 83, a chamber 93, and a passage 94. Thus, when the movable member 83 is in its closed position, the inclined passage 92 communicates with the branch 16a through an opening 95 between the fixed member 82 and a wall of the conduit 85 and the passage 94 communicates with the conduit 85 whereby the fuel flows from the branch 16a through the opening 95, the passage 92, the chamber 93, and the passage 94 to the conduit 85 for circulation through the cooling jacket. At this time, a flange 96 of the movable member 83 has blocked communication of the conduit 86 with openings 97 in the fixed member 84 to prevent flow to the thrust chamber 10.

As shown more clearly in Fig. 1, the fuel returns from the cooling jacket of the combustion chamber 10 to the conduit 86 through a conduit 98. When flow through the conduit 86 is prevented by the flange 96 of the movable member 83, the pressure of the fuel overcomes a check valve 99 and flows through a line 100 to a solenoid valve 101. When the solenoid valve 101 is deenergized during idling, the fuel flows from the valve 101 through a line 102 to the conduit 15 to be supplied to the inlet of the pump 14. When combustion is desired in the thrust chamber 10, the valve 101 is energized and the fuel flows through a line 103 to the conduit 16a to be used in starting.

When the movable member 83 has been moved from its closed position, fuel flows through the conduit 86 and the openings 97 into the thrust chamber 10. The flow of fuel through the openings 97 is throttled by the flange 96. Thus, the pressure supplied to the chamber 90 by the control valve 22 determines the quantity of fuel flowing to the combustion chamber 10.

The control valve 22 includes a cylinder 104 having a passage 105 therethrough in which a piston or rod member 106 is movable. The piston or rod member 106 is of substantially the same size as the passage 105 at its ends but has a reduced diameter therebetween except for two plugs 107 and 108. A conduit 109 connects the passage 105 with the passage 89 of the fixed member 82 to supply fuel to the chamber 88. A conduit 110 connects the passage 105 with the chamber 90 through the passage 91 in the fixed member 84. A conduit 111 connects the passage 105 with the atmosphere. The passage 105 is also in communication with the branch conduit 16a, in which the cylinder 104 is disposed, through passages 112 and 113.

The movement of the piston member 106 to the right, as viewed in Fig. 2, moves the plug 107 between the conduits 109 and 111 and the plug 108 to a position between the conduit 110 and the passage 113; this permits fuel flowing through the conduit 16a to enter the passage 112 and flow through the conduit 109 to the chamber 88 to maintain the valve 21 in its closed position while at the same time any fuel within the chamber 90 is vented therefrom through the conduits 110 and 111 to the atmosphere since the movable member 83 is being urged to the right by the spring 87 and the fuel entering the chamber 88.

Movement of the piston member 106 to the left causes the plug 108 to be disposed between the conduits 110 and 111 while the plug 107 is disposed between the conduit 109 and the passage 112; this allows fuel to enter the passage 113 and flow through the conduit 110 into the chamber 90 to move the movable member 83 to the left to an open position whereby fuel flows into the combustion chamber 10 while the chamber 88 is vented through the conduit 111. It will be noted that the amounts of fuel flowing through the conduit 110 into the chamber 90 depends on the position of the plug 108 with respect to the conduit 110; thus, if the plug 108 only partially uncovers the conduit 110, then the movable member 83 throttles flow into the thrust chamber by means of its flange 96 whereas complete uncovering of the conduit 110 by the plug 108 results in the movable member 83 moving to its completely open position.

The position of the piston member 106 within the passage 105 of the cylinder 104 is determined by the regulator 23. The housing of the regulator 23 has an arm 114 connected at one end to the piston member 106 and pivotally connected at its other end to one end of a bellows 115. The interior of the bellows 115 is supplied with oxygen gas from the regulator 51 by the conduit 53. As previously explained, movement of the throttle member 54 for a greater thrust causes an increase in the amount of oxygen gas passing through the conduit 53 into the interior of the bellows 115. This results in movement of the piston member 106 to the left to increase the flow of fuel to the chamber 90 to supply a greater quantity of fuel to the thrust chamber 10. The arm 114 has a slot 116 therein through which a pivot member 117, attached to the housing of the regulator 23, extends. This permits free movement of the arm 114 in response to movement of the bellows 115. To prevent the fuel in the conduit 16a from acting against the exterior of the bellows 115, a bellows 118 seals against the arm 114. A conduit 118a maintains the interior of the housing of the regulator 23 at atmospheric pressure.

When the pressure of the oxygen gas within the interior of the bellows 115 is reduced or vented, a spring 119 within the cylinder 104 moves the piston member 106 to the right whereby the conduit 110 is connected to the conduit 111 to vent the chamber 90 and the conduit 109 is connected to the passage 112 to supply fuel to the chamber 88 to move the movable member 83 to a partly closed position or its closed position depending on whether pressure within the bellows 115 is reduced or vented. Thus, it will be seen that the control valve 22 and the regulator 23 determine the position of the valve 21.

Referring to Fig. 3, there are shown the details of the valve 27, which controls the flow of liquid oxygen to the chamber 10, the control valve 28, and the regulator 29. The valve 27 includes a stationary member 120, a movable member 121, and a stationary member 122. Resilient means such as a spring 123 is disposed within a chamber 124 formed between the fixed member 120 and the movable member 121. A passage 125 in the fixed member 120 supplies liquid oxygen under pressure to the chamber 124 when desired. Liquid oxygen is supplied through a passage 127 in the fixed member 122 to a chamber 126 formed between the movable member 121 and the fixed member 122. When liquid oxygen is supplied to the chamber 124, it cooperates with the spring 123 to move the movable member 121 to its closed position to stop the flow of liquid oxygen to the chamber 10. When liquid oxygen is supplied through the passage 127 to the chamber 126, the movable member 121 is moved to a partially or completely open position depending on the pressure of the liquid oxygen supplied to the chamber 126.

The control valve 28 determines the pressure of the liquid oxygen supplied to the chambers 124 and 126 in the valve 27. The control valve 28 is similar to the control valve 22 in that it includes a cylinder 128 having a passage 129 therein through which a piston or rod member 130 moves. The ends of the piston member 130 are of substantially the same size as the passage 129 but the piston member 130 has a reduced diameter in the center portion thereof with a pair of plugs 131 and 132 mounted thereon. A conduit 133 connects the passage 129 with the passage 125 to supply liquid oxygen to the chamber 124. A conduit 134 supplies liquid oxygen from the passage 129 to the passage 127 and the chamber 126. A conduit 135 connects the passage 129 with the atmosphere. The passage 129 communicates with the interior of the conduit 20a through passages 136 and 137 in the cylinder 128.

When the piston member 130 is moved to the right, as seen in Fig. 3, the plug 131 is disposed between the conduits 133 and 135 and the plug 132 is disposed between the conduit 134 and the passage 137; this permits liquid oxygen to flow through the passage 136 and 129, the conduit 133 and the passage 125 to the chamber 124 to move the movable member 121 to its closed position while the chamber 126 is vented to the atmosphere through the conduits 134 and 135. When the piston member 130 is moved to the left, the plug 132 is disposed between the conduits 134 and 135 and the plug 131 is disposed between the conduit 133 and the passage 136; this allows liquid oxygen to flow through the passages 137 and 129, the conduit 134, and the passage 127 to the chamber 126 to move the movable member 121 to an open position while the liquid oxygen within the chamber 124 is vented to the atmosphere through the passage 125 and the conduits 133 and 135. It will be seen that the amount of liquid oxygen that the movable member 121 permits to flow through openings 138 in the fixed member 122 depends on the position of the plug 132 with respect to the conduit 134; thus, the movable member 121 permits maximum flow through the openings 138 when the plug 132 has completely uncovered the conduit 134 while any partial uncovering of the conduit 134 results in a partial flow through the openings 138 into the thrust chamber 10.

The movement of the piston member 130 is determined by the regulator 29 having an arm 139 connected at one end to the piston member 130 while the other end is pivotally connected to a bellows 140. The interior of the bellows 140 is supplied with oxygen gas from the regulator 51 through the conduit 53 and a branch conduit 141. As previously explained, the pressure of the oxygen gas flowing through the conduit 53 depends on the amount of thrust desired as indicated by the throttle member 54.

Thus, when maximum thrust is desired from the combustion chamber 10, the greatest pressure is exerted within the control bellows 140 to cause the arm 139 to rotate about a pivot member 142, which is attached to the housing of the regulator 29 and inserted in a slot 143 in the arm 139, to move the piston member 130 to the left against the force of a spring 144 within the cylinder 128. In this position, the plug 132 has completely uncovered the conduit 134 to permit maximum flow of liquid oxygen through the passages 137 and 129 to the chamber 126. To prevent the liquid oxygen in the conduit 20a from acting against the exterior of the bellows 140, a bellows 140a seals against the arm 139. A conduit 143a maintains the interior of the housing of the regulator 29 at atmospheric pressure.

When it is desired to reduce the thrust to zero, the bellows 140 is vented to the atmosphere through the solenoid valve 68 and its vent line 69. This results in the spring 144 forcing the piston member 130 to the right whereby the plug 131 uncovers the conduit 133. This permits maximum liquid oxygen pressure to be exerted through the conduit 133 to the chamber 124 while the liquid oxygen within the chamber 126 is being vented through the conduits 134 and 135. This stops flow through the openings 138 to the combustion chamber 10.

If a thrust less than the maximum is desired, the pressure of the oxygen gas to the interior of the bellows 140 is reduced by the valve 200 in the regulator 51 whereby the conduit 134 is partially uncovered to supply a portion of the liquid oxygen pressure to the chamber 126 and the conduit 133 is partially uncovered to vent a portion of the liquid oxygen within the chamber 124. This permits the movable member 121 to throttle the flow of the liquid oxygen through the openings 138 to the combustion chamber 10. A delay valve 145 is disposed in the branch 141 to insure that the pressure is supplied first to the fuel regulator 23 and then to the liquid oxygen regulator 29. This results in the fuel being supplied to the combustion chamber 10 prior to the liquid oxygen so that there is a fuel rich mixture within the combustion chamber 10 to insure that combustion continues after ignition.

When the valve 27 has stopped flow of liquid oxygen into the thrust chamber 10, it is desired to circulate a small quantity of liquid oxygen through the conduit 20a to carry away the heat generated by the pump 18 plus the heat transferred through the lines to prevent pump cavitation. The liquid oxygen flows from the branch 20a through a line 147, a check valve 148 and a line 149 to the atmosphere. A branch 150 of the conduit 133 connects with one side of a movable piston member 151 within the interior of the housing of the check valve 148. The movable member 151 has a valve portion 152 attached thereto for controlling the flow of liquid oxygen from the line 147 to the line 149 through an opening 153 in the check valve 148. A spring 154 urges the portion 152 against the walls of the opening 153 to prevent flow therethrough. When the liquid oxygen valve 27 is in its closed position, liquid oxygen passes through the conduit 133 and thus flows through the branch 150 to act against the piston member 151 to overcome the force of the spring 154 and permit flow of liquid oxygen through the opening 153 from the line 147 to the line 149. It will be understood that the spring 154 is designed so that if the pressure of the liquid oxygen decreases in the conduits 133 and 150 when the movable member 121 is moved to a partially open position, the spring 154 overcomes the force of the liquid oxygen pressure to move the valve portion 152 to its closed position. This is to prevent bleeding off of the liquid oxygen when a partial flow is occurring through the openings 138 into the thrust chamber 10.

Since the structure of the liquid oxygen valve 30, its control valve 31 and its regulator 32 are substantially the same structure as the valve 27, its control valve 28, and its regulator 29, the details of these structures are not shown. It will be noted (see Fig. 1) that a delay valve 155 is disposed in the conduit 57 for the same purpose that the delay valve 145 is employed in the conduit 141.

The structures of the control valve 25 and its regulator 26 for the fuel valve 24 are the same as the control valve 22 and its regulator 23. The structure of the valve 24 is substantially the same as the valve 21 except that the passages 92 and 94 and the chamber 93 of the valve 21 are not required because fuel is not circulated through the cooling jacket of the combustion chamber 11 during idling as it is circulated through the cooling jacket of the combustion chamber 10. Thus, there is no flow through the cooling jacket of the combustion chamber 11 when the valve 24 is in its closed position. However, when the valve 24 is in an open position, the fuel flows from the valve 24 through a line 156 to the cooling jacket of the combustion chamber 11 and returns to the valve 24 through a line 157. Additionally, a by-pass line 158 connects the interior of the conduit 16b between the control valve 25 and the valve 24 with the line 157; the line 158 is connected to the passage 16b at the same position that the line 103 is connected to the passage 16a. The by-pass line 158 permits fuel to be supplied to the thrust chamber 11 during starting to insure a fuel rich mixture in the combustion chamber 11 at this time.

Referring to Fig. 4, there are shown details of the fuel valve 46 and the liquid oxygen valve 49 that control the supply of fuel and liquid oxygen to the generator 35. The housing of the fuel valve 46 has a pair of passages 159 and 160 controlled by valve members 161 and 162, respectively. Resilient means such as springs 163 and 164 urge the valves 161 and 162 to a closed position to stop flow of fuel through the passages 159 and 160. Energization of a solenoid valve 165 permits fuel to flow into a chamber 166 to act against the valve member 161 to overcome the spring 163 and permit flow from the passage 159 into the conduit 47 to the generator 35. Similarly, energization of a solenoid valve 167 allows fuel to flow into a chamber 168 to act against the valve member 162 to overcome the spring 164 and permit fuel to flow from the passage 160 into the conduit 47. Below a predetermined required thrust, only one of the solenoid valves is energized whereby fuel flows through it into the conduit 47; when the predetermined thrust is exceeded, both of the solenoid valves are energized to supply twice as much fuel to the generator. A conduit 169 connects the passage 160 with the igniter of the generator 35 to supply fuel for starting the generator. A solenoid valve 170 controls flow through the conduit 169.

The liquid oxygen valve 49 has a pair of passages 171 and 172 connecting the conduit 48 with the conduit 50 to supply liquid oxygen to the generator 35. A solenoid valve 173 controls the flow of liquid oxygen from the passage 171 to the conduit 50 while a solenoid valve 174 governs the flow of liquid oxygen from the passage 172 to the conduit 50. A conduit 175 supplies liquid oxygen from the passage 172 to the igniter portion of the generator 35. It will be observed that a portion of the conduit 175 is disposed in heat exchange relation with the generator 35 to transform the liquid oxygen to oxygen gas prior to supply to the igniter. A solenoid valve 176 in the conduit 175 regulates the flow of oxygen gas to the igniter. Flow of oxygen occurs through only one of the passages 171 and 172 to the conduit 50 when only one of the fuel passages 159 and 160 in the housing of the valve 46 is open. When both of the passages 159 and 160 in the housing of the fuel valve 46 are open, both of the passages 171 and 172 of the liquid oxygen valve 49 are open.

In the preferred embodiment disclosed herein, the thrust chamber 10 is designed to produce a maximum thrust of 5,000 pounds with a minimum thrust of 2,500 pounds while the thrust chamber 11 produces a maximum thrust of 10,000 pounds with a minimum thrust of 5,000 pounds. Thus, any thrust may be produced by the operation of one or both of the thrust chambers between the level of 2,500 pounds and 15,000 pounds, the latter being the total maximum thrust of both of the thrust chambers. When fuel and liquid oxygen are supplied to the generator 35 from only one of the passages in each of the housings of the fuel valve 46 and the liquid oxygen valve 49, this supply drives the turbine at a rate whereby the thrust chambers create a maximum thrust of 8,500 pounds. When the throttle means requires a greater thrust than 8,500 pounds, it is necessary to supply fuel and liquid oxygen through both of the passages in the valves 46 and 49. Of course, this causes the turbine to be driven at a rate whereby the thrust chambers produce a maximum thrust of 15,000 pounds. Obviously, it is not desirable to have this amount of power supplied to drive the turbine unless both thrust chambers are producing their maximum thrust so that a portion of this vapor from the generator 35 is dumped overboard through the passage 65 leading from the conduit 36 to the solenoid valve 64.

The details of the by-pass valve 64 and its components are shown in Fig. 5. The flow of the vapor from the conduit 65 to the exhaust conduit 66 is controlled by a valve member 177 within the housing of the valve 64. The valve member is connected to a portion of a bellows 178 by a rod 179. Resilient means such as a spring 180 is disposed within the interior of the bellows 178 to urge the valve member 177 to completely open the conduit 65 to the conduit 66. When only one of the fuel passages and one of the liquid oxygen passages is supplying fuel and liquid oxygen to the generator 35, the throttle means is requiring a thrust of 8,500 pounds or less. At such a time, the solenoid valve 59 is deenergized so that nitrogen gas is supplied through the lines 60 and 62, the solenoid valve 61 and the line 63 to a chamber 181 within the housing of the valve 64. At this time, the solenoid valve 61 is energized to permit flow of the nitrogen from the line 62 to the line 63.

If the throttle means requires more than 8,500 pounds thrust, the solenoid valve 59 is energized to stop flow of nitrogen gas from the line 60 to the line 62. The energization of the solenoid, however, connects the conduit 56 with the line 62 so that oxygen gas from the regulator 52 flows therethrough. At the 8,500 pound thrust requirement, the solenoid valve 61 is deenergized so that the chamber 181 is vented to the atmosphere through the line 63 and a line 182. The deenergization of the solenoid valve 61 prevents flow of the oxygen gas from the line 62 to the line 63 while venting nitrogen gas from the chamber 181. It will be understood that the interior of the bellows 178 is vented to the atmosphere through a line 183. Thus, as this time the spring 180 is able to move the valve member 177 to its completely open position whereby all of the vapor, which is able to pass through the line 65 from the generator, flows outwardly therefrom through the line 66. It will be understood that the line 65 permits only the vapor in excess of the 8,500 pound thrust level to be vented.

When the throttle means requires a thrust of greater than 10,000 pounds, the solenoid valve 61 is energized whereby oxygen gas flows from the line 62 through the valve 61 and the line 63 to the chamber 181 to exert a force against the bellows and tend to close the valve member 177. As the throttle means increases the thrust requirements from 10,000 pounds to 15,000 pounds, the pressure of the oxygen gas flowing from the regulator 52 correspondingly increases due to opening of the valve 240 whereby a greater force is exerted on the bellows 178 to continuously reduce the flow of vapor from the conduit 65 to the conduit 66. When the thrust requirements reach the maximum of 15,000 pounds, the pressure of the oxygen gas flowing into the chamber 181 is sufficient to completely stop the flow of vapor from the conduit 65 to the conduit 66.

Considering the operation of the present invention, the turbine 33 is started by supplying nitrogen from a suitable source (not shown) through a conduit 184 to the line 36, which connects with the inlet of the turbine 33. Actuation of the turbine 33 drives the pumps 14 and 18 whereby fuel flows through the line 16 and liquid oxygen through the line 20. When the fuel flowing through the line 16 after being discharged from the pump 14 reaches a predetermined pressure, the valves 170 and 176 are energized to permit flow of fuel and liquid oxygen to the igniter of the generator 35 to start ignition therein. The ignition is started preferably by a spark plug though other suitable electrical means may be employed. As soon as ignition occurs, one of the passages in the housing of the fuel valve 46 and one of the passages in the housing of the liquid oxygen valve 49 are opened to permit the supply of fuel and liquid oxygen through the conduits 47 and 50, respectively, to the generator 35 to continue combustion therein. When the fuel flowing through the line 16 from the pump 14 reaches a second and higher predetermined pressure, the flow of nitrogen through the line 184 is stopped by suitable valve means (not shown). If this higher predetermined pressure is not reached, the flow of nitrogen is stopped as well as the supply of fuel and oxygen to the generator 35.

During idling, fuel is circulated through the cooling jacket of the combustion chamber 10 and returned through the line 102 to the suction side of the fuel pump 14, as previously set forth. At the same time, liquid oxygen is circulated through the conduits 20a and 20b and discharged therefrom through the conduits 147 and 149 (Fig. 3) as previously explained with respect to the description of the valve 27. This flow of liquid oxygen is sufficient to carry away the heat generated by the liquid oxygen pump plus that transferred through the lines during idling to prevent pump cavitation. Also during idling, fuel is circulated from the conduit 16 back to the conduit 15 through a by-pass line 185 having a pressure relief valve 186 therein. The relief valve 186 permits the power in excess of that required to operate the fuel pump to be absorbed during idling and also operates during periods of thrust operation where the power required for supplying propellants to the engine is less than the developed power.

When a thrust range between 2,500 pounds and 5,000 pounds is required, the throttle member 54 is actuated to rotate the shaft 203. This results in the valve 200 within the housing of the regulator 51 being moved through the linkage mechanism of Fig. 6 by rotation of the cam member 204 through a portion or all of angle A to regulate the flow of oxygen gas from the conduit 43a to the conduit 53. An increase in the required thrust moves the valve 200 to increase the amount of the oxygen gas flowing from the conduit 43a to the conduit 53 whereby a greater pressure is exerted on the regulators 23 and 29. At the same time that the throttle member 54 is actuated, the solenoid valve 67 is energized to permit flow of oxygen gas through the conduit 53 to the regulators 23 and 29. As previously explained, the delay valve 145 permits the fuel regulator 23 to be energized slightly before the liquid oxygen regulator 29 whereby a fuel rich mixture is supplied to the combustion chamber 10.

Prior to the fuel being supplied through the valve 21 and the liquid oxygen through the valve 27, the solenoid valves 74 and 78 are energized to supply fuel and oxygen gas to the igniter portion of the thrust chamber 10 for ignition. The pressure of the fuel in the igniter line 73 is controlled by the regulator 76. The liquid oxygen from the conduit 20 is vaporized by a portion of the conduit 77 being in heat exchange relation with the fuel conduit 16.

When ignition occurs, the solenoid valve 101 is energized to permit the fuel circulating through the cooling jacket of the combustion chamber 10 to return to the conduit 16a through the line 103. At the same time, the solenoid valve 67 is energized to permit the oxygen gas flowing from the regulator 51 to be supplied through the conduit 53 to the regulators 23 and 29 to open the valves 21 and 27 for the supply of fuel and liquid oxygen, respectively, to the combustion chamber 10. As previously explained, the proper sequence of the valve opening for starting is controlled by the delay valve 145. Upon ignition of the combustion process within the chamber 10, the pressure increases and actuates the starting pressure switch 80 to permit the valves 21 and 27 to continue to supply fuel and liquid oxygen to the chamber 10. As the valves 21 and 27 continue to open, the solenoid valves 74 and 78 are deenergized to stop flow of fuel and liquid oxygen through the igniter lines 73a and 77a, respectively.

At this time, the pressure of the nitrogen gas flowing from the conduit 60 to the chamber 181 of the valve 64 maintains the valve member 177 in a closed position so that all of the vapor from the generator 35 is supplied to the turbine 33 to drive the pumps.

It will be understood that suitable safety devices are provided to insure that combustion has occurred in the thrust chamber. Thus, if the switch 80 has not been actuated by the pressure within the combustion chamber 10 in a predetermined period, the entire system is shut down. This includes venting of the regulators 23 and 29 by energizing the solenoid valve 68 to vent the oxygen gas through the line 69. At the same time, the valve 67 is deenergized to stop flow of oxygen gas from the regulator 51.

When a thrust within the 5,000 to 10,000 pound thrust range is desired, the throttle member 54 is actuated to rotate the shaft 203 to move the valve 240, which controls the amount of oxygen gas flowing from the conduit 43b to the conduit 55. The rotation of the shaft 203 moves the cam member 241 through a portion or all of angle B depending on the desired thrust. A greater thrust demand moves the valve 240 to allow a greater flow of oxygen gas from the conduit 43b to the conduit 55. The solenoid valves 75 and 79 in the igniter lines 73b and 77b are energized to permit the supply of fuel and liquid oxygen to the igniter portion of the thrust chamber 11 to start ignition therein. After ignition starts, the solenoid valve 70 is energized to supply oxygen gas through the conduits 55 and 57 to the regulators 26 and 32 to cause the fuel valve 24 and the liquid oxygen valve 30 to open to admit fuel and liquid oxygen to the thrust chamber 11 for combustion therein. As previously explained, the delay valve 155 insures that the valve 24 opens slightly prior to the valve 30 so that a fuel rich mixture exists within the thrust chamber 11. The switch 81 is actuated in response to a pressure within the thrust chamber 11 indicating combustion has occurred therein. The initial flow of fuel is from the conduit 16b through the lines 158 and 157 to the valve 24 as previously explained. As the valves 24 and 30 continue to open after the switch 81 has signaled that combustion has occurred within the chamber 11, the solenoid valves 75 and 79 are deenergized to stop flow of fuel and liquid oxygen to the igniter portion of the chamber 11. After the thrust chamber 11 has started to produce a thrust level between 5,000 and 10,000 pounds, operation of the thrust chamber 10 is stopped by deenergizing the solenoid valve 67 to stop the flow of oxygen gas through the conduit 53 and energizing the solenoid valve 68 to vent the oxygen gas through the line 69 from the bellows 115 in the regulator 23 and the bellows 140 in the regulator 29 to close the valves 21 and 27 to stop flow of fuel and liquid oxygen to the chamber 10.

As previously explained, the valve 200 remains open when the cam member 204 is rotated through the angle B and oxygen gas would be supplied to the regulators 23 and 29 except for the valve 67.

If the thrust required falls within the range of 8,500 to 10,000 pounds, both of the passages within the housing of the fuel valve 46 and both of the passages within the housing of the fuel valve 49 are open to change the operating level of the gas generator 35 from single to two stage. With the chamber 181 vented of its nitrogen gas, as previously set forth, the valve 177 completely opens the conduit 65 to the conduit 66 to permit the excess vapor to flow from the conduit 36.

When it is desired to operate at a thrust level between 10,000 and 15,000 pounds, the range of the pressure regulator 52 must be shifted back to its 5,000 pound starting point. This shifting is accomplished by energizing a solenoid valve 187 (Fig. 1) so that nitrogen gas under pressure from a suitable source (not shown) is supplied through a conduit 188 to the solenoid valve 187 and through the conduit 189 to the interior of the cylinder 246 within the regulator 52. A line 190 vents the interior of the cylinder 246 within the regulator 52 whenever the solenoid valve 187 is deenergized.

Since the regulator 52 has been shifted to its 5,000 pound starting point, the starting of the thrust chamber 11 causes the gas generator 35 to operate only at its single stage propellent level with the valve member 177 closed. Immediately following a start of the thrust chamber 11, the solenoid valve 61 is deenergized and the gas generator 35 shifts to its two stage operation with the valve member 177 in its open position since the chamber 181 is vented through the deenergized solenoid valve 61. At this time, the solenoid valve 70 is momentarily deenergized to trap the oxygen gas pressure in the bellows of the regulators 26 and 32 to maintain thrust operation of the chamber 11. At this time, the thrust chamber 10 is started as previously described with respect to this chamber. After the thrust chamber 10 is successfully started, the solenoid valve 70 is again energized to permit normal control of the regulators 26 and 32. At this time, both the solenoid valve 59 and the solenoid valve 61 are energized whereby oxygen gas from the regulator 52 is supplied to the chamber 181 to control the position of the valve member 177 in accordance with the thrust level. As the thrust demand increases from 10,000 to 15,000 pounds, the cam member 241 rotates through the angle C to move the valve 240 towards its fully open position. As previously explained, the supplying of nitrogen gas to the interior of the cylinder 246 returns the valve 240 to the position in which the amount of oxygen gas flowing therethrough permits the thrust chamber to operate at its minimum thrust.

When it is desired to advance the thrust beyond the 5,000 pound thrust limit of the chamber 10, there is a change over from the thrust chamber 10 to the thrust chamber 11. However, discontinuity in thrust is minimized by making a shutdown of the thrust chamber 10 dependent upon the successful starting of the thrust chamber 11. Conversely, in retarding the throttle below the transition point at the 5,000 pound thrust position, termination of the thrust chamber 11 is dependent upon successful starting of the thrust chamber 10. A similar sequence is utilized at the 10,000 pound thrust transition where the shift of the thrust chamber 11 from 10,000 pounds to 5,000 pound thrust through the regulator 52 is made contingent upon the successful starting of the thrust chamber 10.

While the thrust chambers have been described as capable of producing maximum thrusts of 5,000 and 10,000 pounds, respectively, it will be understood that any two thrusts could be produced by the thrust chambers. It is merely necessary for continuous thrust operation that the minimum thrust of the larger chamber be equal to the maximum thrust of the smaller thrust chamber. An advantage of this invention is that it produces a continuous thrust range for a rocket engine without loss of power.

For purposes of exemplification, a particular embodiment of the invention has been shown and described according to the best present understanding thereof. However, it will be apparent that changes and modifications in the arrangement and construction of the parts thereof may be resorted to without departing from the true spirit and scope of the invention.

We claim:

1. A rocket motor including two continuously variable thrust chambers, each of the thrust chambers producing a different maximum thrust, one of the thrust chambers having a maximum thrust equal to the minimum thrust of the other of the thrust chambers, means to supply fuel and oxidizer to both of the thrust chambers to provide a continuous thrust range of the rocket motor varying form the minimum of the one thrust chamber to the combined maximum of both of the thrust chambers, and control means stopping the supply of fuel and oxidizer to the other thrust chamber and varying the supply of fuel and oxidizer to the one thrust chamber to vary the thrust of the one thrust chamber continuously from its minimum to its maximum to produce the lowest portion of the thrust range of the rocket motor, said control means stopping supply of fuel and oxidizer to the one thrust chamber and varying the supply of fuel and oxidizer to the other thrust chamber to vary the thrust of the other thrust chamber continuously from its minimum to its maximum to produce the middle portion of the thrust range of the rocket motor, said control means allowing the supply of fuel and oxidizer to the one thrust chamber to produce its maximum thrust and varying the supply of fuel and oxidizer to the other thrust chamber to vary its thrust continuously from its minimum to its maximum to combine with the maximum thrust of the one thrust chamber to produce the highest portion of the thrust range of the rocket motor.

2. A rocket motor including two thrust chambers, each of the thrust chambers producing a different maximum thrust, one of the thrust chambers having a maximum thrust equal to the minimum thrust of the other of the thrust chambers, pump means to supply fuel to each of the thrust chambers, pump means to supply oxidizer to each of the thrust chambers, first fuel valve means to regulate the amount of fuel supplied to the one thrust chamber, first oxidizer valve means to regulate the amount of oxidizer supplied to the one thrust chamber, second fuel valve means to regulate the amount of fuel supplied to the other thrust chamber, second oxidizer valve means to regulate the amount of oxidizer supplied to the other thrust chamber, a first regulator connected to the first fuel and oxidizer valve means to control the position of the first fuel and oxidizer valve means, a second regulator connected to the second fuel and oxidizer valve means to control the position of the second fuel and oxidizer valve means, and throttle means connected to both of said regulators, the throttle means actuating the first regulator to move the first fuel and oxidizer means to vary the thrust in the one thrust chamber from its minimum to its maximum to produce a first thrust range of the rocket motor, the throttle means actuating the second regulator to move the second fuel and oxidizer valve means to vary the thrust in the other thrust chamber from its minimum to its maximum to produce a second thrust range of the rocket motor, means to move the first fuel and oxidizer valve means to a closed position to inactivate the one thrust chamber when the second regulator is actuated, said moving means returning the first fuel and oxidizer valve means to a fully open position to produce a maximum thrust in the one thrust chamber when the other thrust chamber reaches its maximum thrust, said second regulator including means to move the second fuel and oxidizer valve means when the one thrust chamber is producing its maximum thrust to a position wherein the other thrust chamber produces its minimum thrust, the throttle means actuating the second regulator to move the second fuel and oxidizer valve means to vary the thrust in the other thrust chamber from its minimum to its maximum to combine with the maximum thrust of the one thrust chamber to produce a third thrust range of the rocket motor.

3. A rocket motor including two thrust chambers, each of the thrust chambers producing a different maximum thrust, one of the thrust chambers having a maximum thrust equal to the minimum thrust of the other of the thrust chambers, pump means to supply fuel to each of the thrust chambers, pump means to supply oxidizer to each of the thrust chambers, first fuel valve means to regulate the amount of fuel supplied to the one thrust chamber, first oxidizer valve means to regulate the amount of oxidizer supplied to the one thrust chamber, second fuel valve means to regulate the amount of fuel supplied to the other thrust chamber, second oxidizer valve means to regulate the amount of oxidizer supplied to the other thrust chamber, a constant pressure source, a first regulator connected to the pressure source, a second regulator connected to the pressure source, first conduit means connecting the first regulator and the first fuel and oxidizer valve means, second conduit means connecting the second regulator and the second fuel and oxidizer valve means, said first regulator having valve means to regulate the pressure in the first conduit means; said second regulator having valve means to regulate pressure in the second conduit means, throttle means actuating the valve means in the first regulator to control the pressure in the first conduit means to change the position of the first fuel and oxidizer valve means to vary the thrust produced by the one thrust chamber from its minimum to its maximum to provide the lower part of the thrust range of the rocket motor, the throttle means acuating the valve means in the second regulator when the one thrust chamber has reached its maximum thrust to control the pressure in the second conduit means to change the position of the second fuel and oxidizer valve means to vary the thrust produced by the other thrust chamber from its minimum to its maximum to provide the middle part of the thrust range of the rocket motor, means in said first conduit means to stop transmission of pressure to the first fuel and oxidizer valve means and vent the first fuel and oxidizer valve means to atmosphere when the other thrust chamber produces its minimum thrust, said stopping means in said first conduit means allowing transmission of pressure through said first conduit means to the first fuel and oxidizer valve means when the other thrust chamber reaches its maximum thrust to move the first fuel and oxidizer valve means to the position producing maximum thrust in the one thrust chamber, means to move the valve means in the second regulator to reduce the pressure in the second conduit means to decrease the thrust produced by the other thrust chamber to its minimum when the one thrust chamber regains its maximum thrust, the throttle means actuating the valve means in the second regulator to control the pressure in the second conduit means to change the position of the second fuel and oxidizer valve means to vary the thrust produced by the other thrust chamber from its minimum to its maximum to combine with the maximum thrust of the one thrust chamber to produce the highest part of the thrust range of the rocket motor.

4. A rocket motor including two continuously variable thrust chambers, each of the thrust chambers producing a different maximum thrust, one of the thrust chambers having a maximum thrust equal to the minimum thrust of the other of the thrust chambers, pump means to supply fuel and oxidizer to each of the thrust chambers to provide a continuous thrust range of the rocket motor varying from the minimum of the one thrust chamber to the combined maximum of both of the thrust chambers, turbine means connected to the pump means to drive the pump means, generator means to supply vapor to drive the turbine means, said generator means including means to vary the amount of vapor supplied to the turbine means in accordance with the thrust desired from the thrust chambers, and control means stopping the supply of fuel and oxidizer to the other thrust chamber and varying the supply of fuel and oxidizer to the one thrust chamber to vary the thrust of the one thrust chamber continuously from its minimum to its maximum to produce the lowest portion of the thrust range of the rocket motor, said control means stopping supply of fuel and oxidizer to the one thrust chamber and varying the supply of fuel and oxidizer to the other thrust chamber to vary the thrust of the other thrust chamber continuously from its minimum to its maximum to produce the middle portion of the thrust range of the rocket motor, said control means allowing the supply of fuel and oxidizer to the one thrust chamber to produce its maximum thrust and varying the supply of fuel and oxidizer to the other thrust chamber to vary its thrust continuously from its minimum to its maximum to combine with the maximum thrust of the one thrust chamber to produce the highest portion of the thrust range of the rocket motor.

References Cited in the file of this patent

UNITED STATES PATENTS 2,723,531   Wosika et al. _____ Nov. 15, 1955

FOREIGN PATENTS 719,946   Great Britain _____ Dec. 8, 1954

OTHER REFERENCES

"Rocket Engine Developments" by Roy Healy, Aero Digest, November 1947, pages 38 to 41, 116, 119 and 120.